Dec. 28, 1943.   H. J. SHAFER   2,337,841
CONTROL VALVE
Filed July 14, 1942   7 Sheets-Sheet 1

Inventor
HOMER J. SHAFER
By Alfred F. Dees
Attorney

Dec. 28, 1943.     H. J. SHAFER     2,337,841
CONTROL VALVE
Filed July 14, 1942     7 Sheets-Sheet 2

Inventor
HOMER J. SHAFER
By Alfred F. Rees
Attorney

Dec. 28, 1943.　　　H. J. SHAFER　　　2,337,841
CONTROL VALVE
Filed July 14, 1942　　　7 Sheets-Sheet 3

Inventor
HOMER J. SHAFER
By Alfred F. Rees
Attorney

Dec. 28, 1943.  H. J. SHAFER  2,337,841
CONTROL VALVE
Filed July 14, 1942  7 Sheets-Sheet 4

Inventor
HOMER J. SHAFER
By
Alfred F. Dees
Attorney

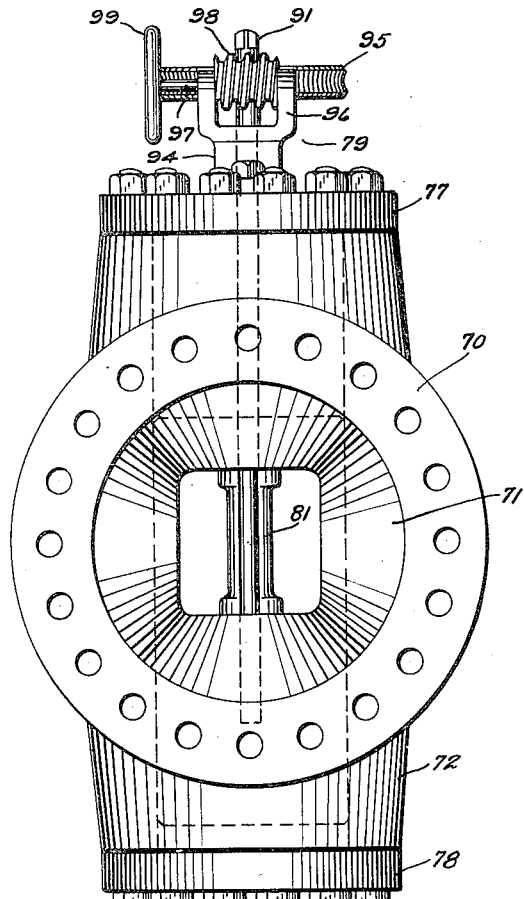
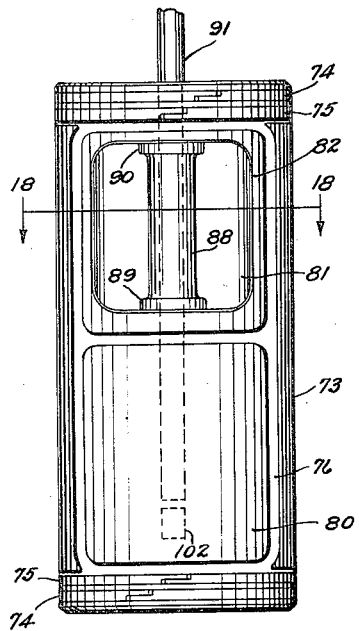
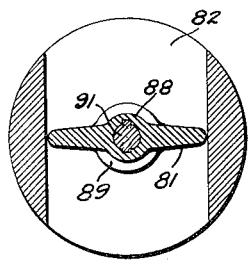
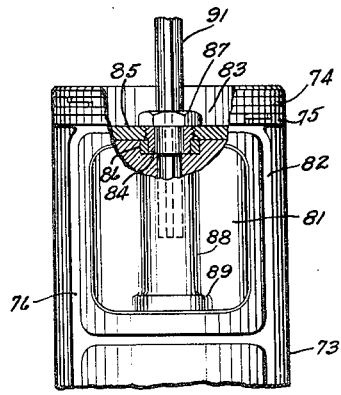
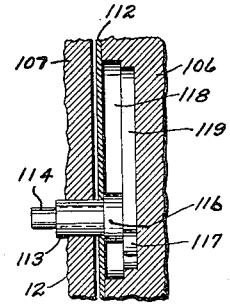

Inventor
HOMER J. SHAFER

Patented Dec. 28, 1943

2,337,841

UNITED STATES PATENT OFFICE 2,337,841

CONTROL VALVE

Homer J. Shafer, Mansfield, Ohio, assignor to The Ohio Brass Company, Mansfield, Ohio, a corporation of New Jersey Application July 14, 1942, Serial No. 450,931

26 Claims. (Cl. 137—139)

This invention relates to large capacity high pressure valves and in its more specific aspects is directed to a control means for opening and closing such valves whereby leakage is prevented between the high and low pressure sides thereof.

The object of the invention is to construct a piston type valve in which leakage past the piston into the low pressure side of the valve will be prevented.

Another object of the invention is to provide a piston for a piston valve which has means thereon to prevent the escape of high pressure fluid when the valve is in its closed position.

A further object of the invention is to provide a piston for a piston valve that combines the effective features of a pressure ring and of a lubricant seal to prevent the escape of pressure fluid past the piston.

A still further object of the invention is to combine the pressure sealing properties of pressure or piston rings and pressure sealing lubricant to prevent the escape of pressure fluid between the piston and piston wall.

A still further object of the invention is to dispose the control handle on the valve housing such that it will be on the same side of the valve housing as the indicator in order to facilitate more accurate control of the valve.

Another and still further object of the invention is to provide for the short-circuiting of any leakage that may occur between the piston valve and the housing on the high pressure side of the valve.

Another object of the invention is to provide means in a piston valve to hold leakage to an irreducible minimum making it possible to use smaller passages and parts in the control mechanism.

A further object of the invention is to provide some mechanical means on the piston to compensate the loss of density and pressure in the lubricant seal such that pressure will be held at the ends of the piston.

A still further object of the invention is to provide a combination stop and throttle valve in which means is provided to prevent leakage from the high pressure side to the low pressure side of the valve when it is in throttling position.

Still another object of the invention is to provide in a combination shut-off and throttling valve means to prevent leakage in all positions of the valve and means to govern the throttling of the valve from the same operative position as the shut-off is governed from.

Still another object of the invention is to provide in a valve housing a removable liner wherein leakage between liner and housing is prevented by means of the pressure sealing lubricant used to prevent leakage between piston and liner and supplied from a common source.

A still further object of the invention is to provide a means for servicing the motor portion of a valve in situ thereby obviating the necessity of removing the entire valve from the line.

Another and still further object of the invention is to provide a unitary check valve in the control conduits that will eliminate freezing of the valve and the chatter of two individual valves previously employed and which will positively provide for one of the two control lines to be open.

Another and still further object of the invention is to simplify the construction and servicing of a valve control, improve the operation thereof, decrease the number of parts and to decrease the cost of manufacture.

Other and further objects of the invention will occur to those skilled in the arts to which this invention pertains as the description proceeds which taken in connection with the accompanying drawings sets forth a preferred embodiment as well as selected modifications thereof, but such disclosures are not to be construed as a limitation of the invention which is limited only by the appended claims, and any and all modifications, variations and alterations of structure coming within the spirit and scope thereof are deemed to be included herein.

In the drawings:

Fig. 16 shows an end elevational view of the valve of Fig. 14.

Fig. 17 shows an elevational view of the piston employed in the valve of Fig. 14.

Fig. 18 shows a section view along the line 18—18 of Fig. 17.

Fig. 19 shows an enlarged detail partly in section of the upper end of the piston of Fig. 14.

Fig. 22 shows a partial section view of a portion of the valve of Fig. 20.

Valves employed in lines conducting relatively high pressure gaseous or liquid fluids are of a generally large bore and the problem of leakage in the valve when it is closed is very troublesome accounting for a considerable loss in quantity of fluid and loss in line pressure. Various expedients in the past have been employed to overcome this difficulty but temperature variation and distortion in the several parts due to the pressure in the line have accelerated fluid and pressure losses and obsoleted such expedients. Manufacturing difficulties many times preclude a precision fit of the parts and auxiliary devices and aids must then be employed. One expedient is the use of a special lubricant but this too is sensitive to temperature conditions and even when attention is given to the temperature range in which any given grade of lubricant is intended to operate most satisfactorily, it still is unable to satisfactorily check the leakage caused by distortion in the valve parts by reason of variations in temperature conditions in combination with high unit pressure. The instant invention therefore has been conceived as a solution for leakage prevention and a pressure control operating in conjunction with each other that has reduced the leakage to a point where there is for all practical purposes no loss of fluid or of pressure and which still enables a quick certain opening and closing of the valve and in which provision is made for the speedy determination of the position of the valve core or plunger in the housing of the valve.

Figure 1:
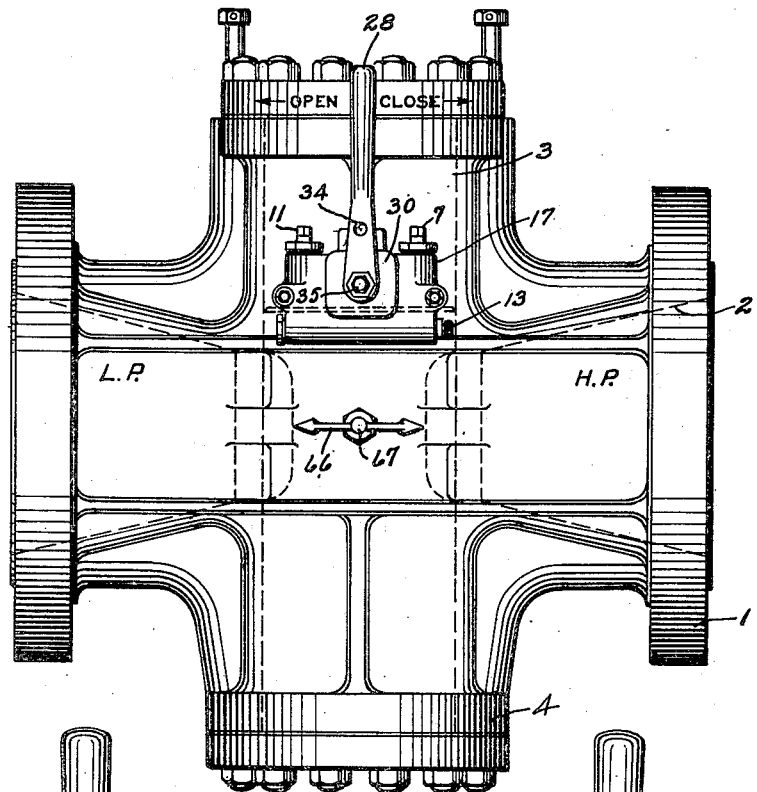
Fig. 1 shows an elevational view of the operator's side of a valve incorporating the invention.

The above desired results and objects are embodied in a valve structure comprising a housing 1 having a bore or passageway 2 therein indicated by dotted lines in Fig. 1 and having a cylinder 3 the longitudinal axis of whose bore is transverse to the axis of bore 2. Disposed within the cylinder 3 for reciprocation therein is a piston or plunger 4 which has a bore 5 through one end thereof that is adapted in the open position of the valve to communicate with the bore 2 of the valve housing 1 and the other end of the piston 4 is adapted when in the other position in the bore to close the valve by obstructing the passageway or bore 2. These two positions of the piston are more particularly shown and set forth in Figs. 8 and 9 of the drawings.

Figure 8:
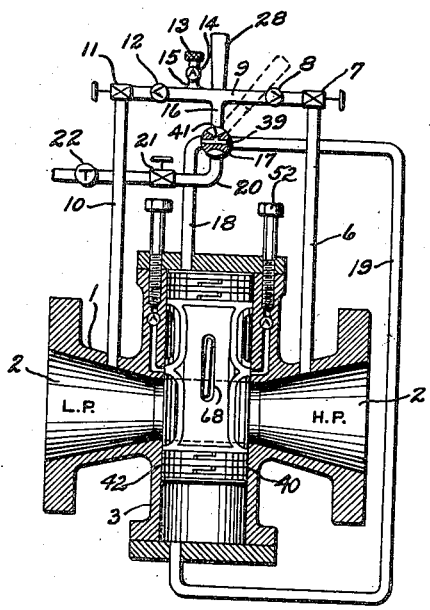
Fig. 8 shows the condition of the control circuit when the valve is in its closed position.
Figure 9:
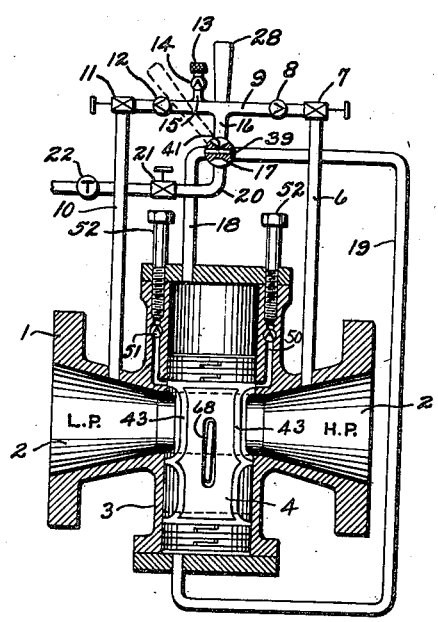
Fig. 9 shows the condition of the control circuit when the valve is in its open position.

The source of energy for reciprocating the piston 4 in the cylinder 3 is usually derived from the high pressure (H. P.) side of valve 1 and the mechanism for its control is quite similar in character to that shown in copending application, Serial Number 415,357, filed October 17, 1941. Assuming that the right hand side of the valve, as shown in Figs. 1, 8 and 9 is the high pressure (H. P.) side and the left hand side of those views is the low pressure (L. P.) side it is apparent that pressure fluid will flow through conduit 6 past stop valve 7 into conduit 9 in which check valve 8 is inserted. The other side of valve 1 has a similar conduit and valve arrangement in which conduit 10 is connected to the low pressure side at its one end and is connected to stop valve 11, that has conduit 9 secured thereto and in which a second check valve 12 is located. Check valve 8 is adapted to be opened by high pressure fluid and simultaneously close valve 12 and when pressure fluid is derived from the low pressure side it will open valve 12 and simultaneously close valve 8. In the ordinary operation of the valve one or the other of stop valves 7 or 11 is usually though not necessarily closed depending upon which source of pressure fluid is employed.

Conduit 9 has arranged thereon a short conduit 15 interiorly connected therewith and having a check valve 14 provided therein to prevent the flow or escape of pressure fluid therefrom when cap or closure element 13 is removed. The purpose of this structure is to permit conduit 9 to receive pressure fluid from an external source in the event of failure of pressure on either side of valve 1. Check valve 14 retains in the control system any pressure fluid admitted thereto through conduit 15. Whenever an external source of pressure fluid is employed stop valves 7 and 11 are both closed to prevent it from escaping to either of the conduits connected to the valve because it takes a comparatively high pressure to move valves 8 and 12 which is much greater than the external pressure relied upon.

Conduit 16 connects to conduit 9 and leads to the housing of valve 17. Leading from valve 17 are two conduits, 18 and 19, connected to opposite sides of valve 17 and, that connect with the interior of the cylinder 3 at the opposite ends thereof. Another conduit 20 connects to the valve 17 and has a stop valve 21 therein and a throttle valve 22. Conduit 20 exhausts to the atmosphere and the valve 22 controls the rate of flow there-through or the exhaust from cylinder 3. It should be evident that valve 17, which is in effect a reversing valve, controls the admission of pressure fluid to the cylinder 3 to determine the direction piston 4 shall move to either open or close valve 1. The several conduits 6, 10, 18 and 19 are formed, preferably, in the walls of housing 1 as shown in the application identified above. This expedient obviates the use of external conduit and produces a neater and more easily maneuverable structure.

Figure 2:
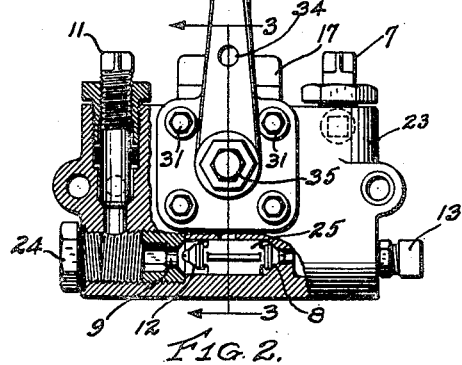
Fig. 2 shows a detail view partly in section of the control unit of the improved valve.
Figure 3:
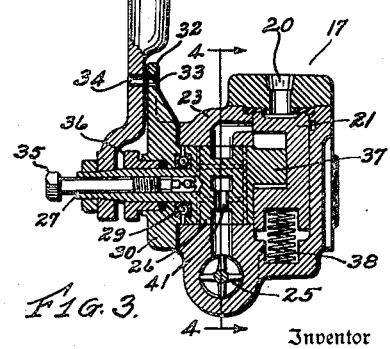
Fig. 3 shows a section view of the control unit taken along the line 3—3 of Fig. 2.
Figure 4:
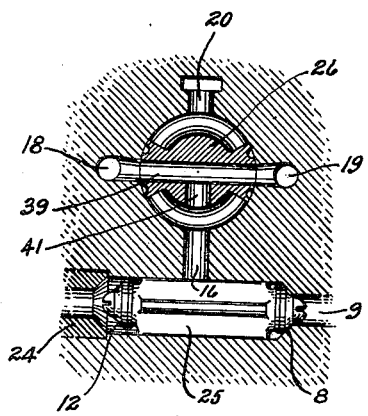
Fig. 4 shows a section view taken along the line 4—4 of Fig. 3.

The valve 17 is set forth in greater detail in Figs. 2 and 3 and in general is formed along the same lines of construction as the corresponding valve set forth in the copending application identified above. Certain structural improvements have been incorporated to vastly improve the operation of the valve as well as a compacting of the mechanism to thereby present a neater appearing device.

The valve 17 comprises initially a housing 23 which is securable to the housing 1 by any appropriate means and in each side of which valves 7 and 11 are arranged. The valves are adjustable therein and the seats of those valves are integrally formed in the housing 23 and connect with the conduits 6 and 10 that are preferably formed in the walls of housing 1 as shown in the above identified copending application. Access to conduit 9 is gained through removable plug 24 through which valves 8 and 12 are inserted. Valves 8 and 12 are fixed to a common support 25 that is freely slidable in the conduit 9. The valves 8 and 12 are assembled on to the common support to positively assure that one or the other of them will be open and avoid a freezing or sticking of the valves and for the further reason of eliminating the chattering of valves caused by pulsation introduced into the pressure fluid by the pressure pumps when the valve is installed reasonably close to the line pressure pump. Valve 12 seats against a seat formed in plug 24 and valve 8 seats against a seat formed in the housing 17.

The piston 4 is reciprocated in the cylinder 3 by means of pressure fluid selectively admitted to either end of the cylinder and this selection is governed by means of a pilot or reversing valve element in valve 17 having a core 26 provided with a stem 27 extending beyond the casing 23 of valve 17 and to which a handle 28 is removably secured. To facilitate rotation of the core 26 in the housing or casing 23 an anti-friction bearing 29 is interposed between the core 26 and a retaining plate 30 removably secured to the housing 17 by means of a plurality of screws 31. A bracket 32 integral with plate 30 has a hole 33 therein co-axial with a hole 34 in the handle 28 adapted to receive a lock (not shown) such that all but intentional movements of the handle 28 will be obviated. The core 26 is provided with lubricant grooves to prevent leakage to which lubricant is admitted and forced therein by screw 35, as set forth in the above identified application. A packing gland 36 is arranged in plate 30 to prevent leakage between the stem 27 and plate 30.

Fixed to the lower end of the valve core 26 is a cam 37 that engages an appropriate slot or seat in the shut-off valve 21, inserted in the exhaust conduit 20 of the system for the purpose of opening said valve 21. A spring 38, as shown, is employed for the purpose of closing valve 21. The structural details hereof are the same as those in the above identified application.

The expedient employed for preventing leakage of pressure fluid between the piston 4 and the valve housing 1 or the walls of cylinder 3 constitutes initially a neutralizing or balancing of pressures about the first point of leakage. In the above identified application the pressure for moving the piston upon the completion of motion, is neutralized through the passageway 39 such that pressure on both ends of the piston is exactly the same. Under this condition and with high pressure coming from the right force would be exerted against the piston urging it to the left and breaking the seal at the position or line 40 thereby allowing high pressure fluid to enter the cylinder 3 past the sealing means. Applicant has made provision for short-circuiting this leakage or failure of seal by providing in the valve core 26 a passage 41 disposed at right angles to passage 39 which neutralizing passageway includes conduit 6, valve 7, conduit 9 and valve 8, conduit 16, passageways 41 and 39, and conduit 19. Upon a proper setting of the valves the opposite side of the valve or the low pressure (L. P.) side is short-circuited in the same manner. While piston 4 may be still be urged to the left under the influence of pressure from the high pressure conduit there will be no breaking of the seal between piston 4 and the walls of cylinder 3. The fact that pressure will be increased along the line 42 will only aid in preventing escape of high pressure fluid to the low pressure (L. P.) side of the valve housing 1.

Complementing the short-circuiting of leakage about 40 is the grease or lubricant seal provided in grooves 43 subsequently more fully described which are so disposed about the piston 4 as to completely circumscribe passageway 5 in piston 4 and bore 2 in housing 1 and also about the solid or closed portion of the piston that closes bore or passageway 2 in valve housing 1. The lubricant employed in those grooves is a very dense, heavy variety and will cause an appreciable drag in resistance to movement of the piston. Advantage is taken of this in holding the piston at rest when the pressure on both ends of the piston is the same in preventing piston movement in the cylinder 3 by turbulence in the pressure fluid transmitted. The fluid movement through the valve will set up a degree of turbulence by reason of the valve shape and characteristics thereof. By using a rather stiff, dense, heavy lubricant any tendency of piston movement because of turbulence is thereby obviated and no restriction in the throat of the valve is effected allowing therefore a continued uninterrupted full flow of pressure fluid. The lubricant serves the dual purpose of preventing leakage and to prevent piston movement.

Figure 5:
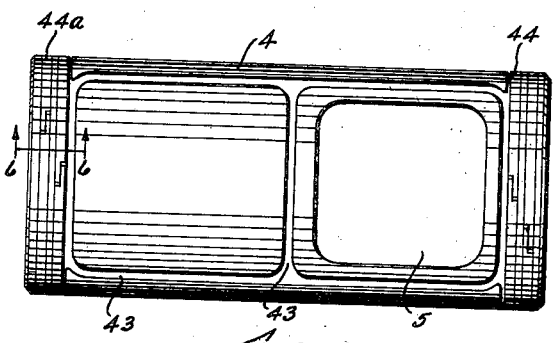
Fig. 5 shows a side elevational view of the piston employed in the valve of Fig. 1.
Figure 6:
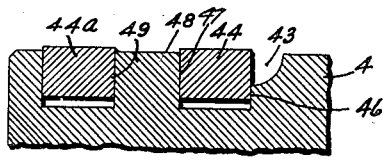
Fig. 6 is a section view taken substantially along the line 6—6 of Fig. 5.
Figure 7:
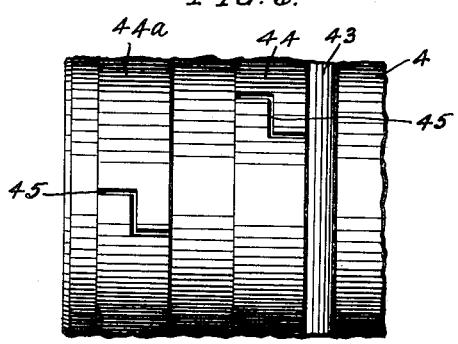
Fig. 7 is an enlarged plan view of a portion of the pressure rings showing the relation of lubricant groove and pressure rings.

Still further assisting the prevention of leakage and directly tying in with the short-circuiting described and grease or lubricant seal is the provision of pressure rings in combination with the grease seal as shown in greater detail in Figs. 6 and 7. The mode of procedure prior to the disclosed device was by a lubricant seal alone, an expedient reasonably well-known in the art. To increase the effectiveness of the seal there is provided a plurality of pressure rings more or less generally shown in Fig. 5 but more specifically shown in Figs. 6 and 7. By combining these ideas in a special way and making their functioning interdependent a seal is provided that keeps leakage of pressure fluid at a minimum.

The piston 4 is provided with a plurality of plain pressure rings 44, 44a at each end, preferably two in number. These are arranged, as shown, near the end of the piston. Attention is now invited to the coordination of the grease seal and the rings which combination and interdependence of parts is clearly shown in Figs. 6 and 7. It will be observed that groove 43 in which a grease seal is maintained is disposed in immediate proximity to ring 44, the one nearest the center of the piston. It will be observed that the sealing action of the grease is added to that of the rings. Lubricant has a tendency to break down under a pressure differential but when it is supported by a ring, as shown, it will not break down but will remain firm and hold because the ring which has a sealing action itself will support the grease and the two combined will cooperate to provide a much greater and more reliable seal than either expedient taken alone; in fact the association of the two expedients produces results far in excess of the sum of the two expedients taken individually.

The rings are supplied at the ends of the piston only because lubricant is supplied to the grooves 43 at the point adjacent the throat of the valve and it will be under its greatest pressure and density at this point. This pressure is usually of such an extent as to preclude the possibility of seal breakage and for that reason rings are not supplied in the middle of the piston. As the lubricant moves farther away from its point of entry, or source of supply, the density and pressure thereof decrease and in order for it to hold pressure fluid it must be aided or reinforced. The pressure rings 44, 44a provide the necessary reinforcement and compensate for the loss of lubricant density and pressure thereby preventing the leakage of pressure fluid past the ends of the piston.

Attention is further invited to the fact that one portion of the circumferentially disposed lubricant grooves 43 adjacent ring 44 is of greater width than the remaining portion. The greatest accumulation of lubricant is at or opposite the ring joints 45 because it is at this point that the greatest possibility of leakage occurs. The narrower portion of the grease groove lies adjacent, the unbroken or unjointed portion of the rings which in practice is about 50% of the width of the wider portion of the lubricant groove. The narrow slot acts as a safety element to receive any grease not able to get into the wider grooves.

The second or outer ring 44a disposed adjacent the ends of piston 4 functions as a wiper element to prevent escape of lubricant. Lubricant has a tendency to creep between the ring and walls of the piston ring grooves as well as between the cylinder housing and piston along surfaces 46—49 inclusive and any lubricant creeping will be prevented from getting into cylinder 3 by the outer ring 44a. The second ring is also adapted to prevent escape of pressure fluid should any get past the first ring and its complemental lubricant in the groove 43 as well as prevent lubricant from getting into the ends of the cylinder.

Lubricant is admitted to the grooves 43 in the surface of piston 4 by means of two conduits 50 which are intended to open into the groove 43 at diametrically disposed points. The ports of the conduits 50 open into grooves 43 in the two different piston positions, viz; the open and closed position of the valve as shown in Figs. 8 and 9. Check valves 51 are provided in each conduit 50 and screws 52, 52 are adapted to force lubricant into the grooves 43 in the piston 4. With the foregoing mechanism lubricant is forced into the several lubricant channels provided on the piston surface which cooperate with rings 44, 44a to provide a more perfect seal against pressure fluid leakage.

Figure 10:
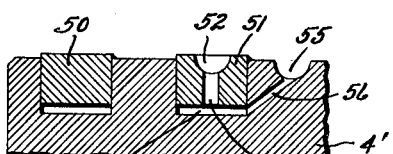
Fig. 10 shows a section view of a modification of the piston of Fig. 5 in a view similar to Fig. 6.
Figure 11:
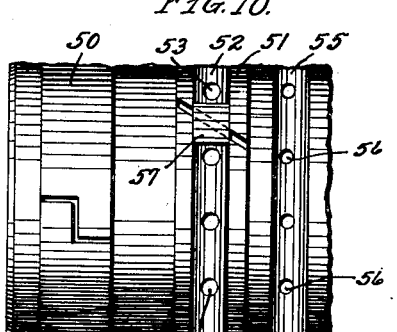
Fig. 11 shows a plan view of a portion of the pressure ring and lubricant groove formation of Fig. 10.

A modification of the lubricant groove and ring structure for the piston 4 is shown in Figs. 10 and 11 in which a section of a piston 4' having ring grooves formed therein that receive rings 50 and 51 is disclosed that increases the effective pressure seal. Ring 50 is disposed adjacent the end of the piston 4' and serves exactly the same function as does the ring 44a which is disposed nearest the end of piston 4. Ring 51 combines a lubricant retainer in the surface thereof as shown which is in the form of a groove 52 circumferentially disposed about the ring 51. At the base of the groove 52 the ring is provided with a plurality of radial apertures 53 that communicate with a space 54 between the ring 51 and the bottom of the ring groove. These piston walls are provided with the usual lubricant groove 55 formed, in the same manner as grooves 43, about the piston 4' surface but in which the circumferential portions of the groove are displaced from the ring 52. Ducts 56, 56 connect lubricant ring or groove 55 with space 54 from where lubricant will travel through apertures 53 to the groove 52 to completely fill the latter. In this manner the groove 52 will, when completely filled and with the full measure of the ring tension applied against the lubricant therein and against the cylinder wall, thereby effectively cooperate to provide an extremely tight pressure seal. The same type of narrow and wide groove formation as previously set forth is employable herein, it being further understood that both ends of the piston are equipped with pressure sealing rings and lubricant grooves. In order to prevent leakage past the ends of the ring 51, an insert 57 may be inserted in groove 52, if so desired, such that lubricant will be less likely to escape through the bevel cut ends of the ring 51. This is an expedient wholly optional with the designer.

Figure 12:
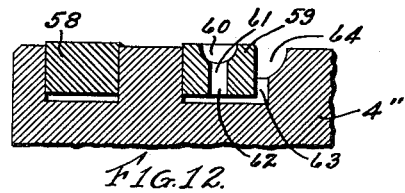
Fig. 12 shows a section view of another modification in a view similar to Fig. 6.
Figure 13:
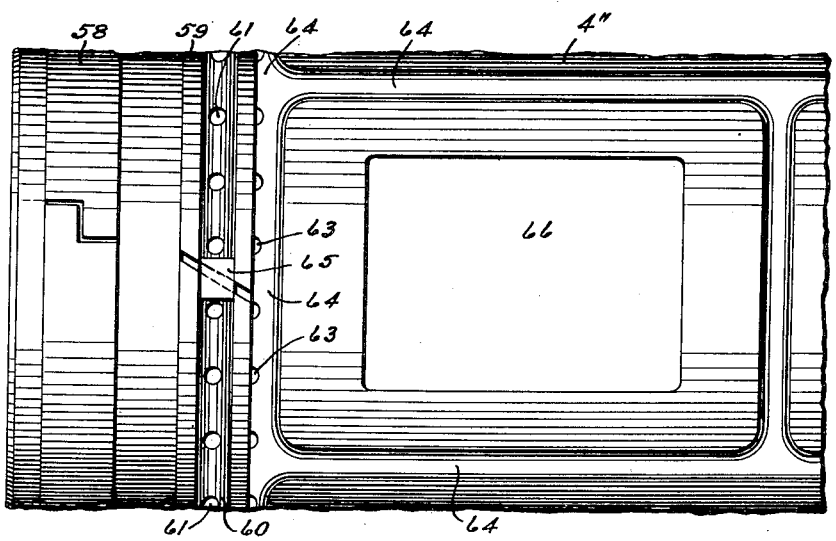
Fig. 13 shows an enlarged plan view of a portion of the pressure ring and lubricant groove formation of Fig. 12.
Figure 15:
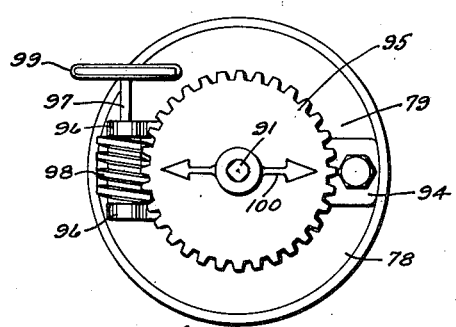
Fig. 15 shows a plan view of the operating mechanism of the throttle valve shown in Fig. 14.

A still further modification of the ring and lubricant seal is set forth in Figs. 12 and 13. Herein there is provided in piston 4" a pair of rings 58 and 59 in which the ring 58 functions identically as the ring 50 of piston 4' and ring 44a of piston 4. As in the previous instances both ends of the piston 4" have rings 58 and 59 thereon to prevent pressure fluid leakage.

Ring 59 is identical with ring 51 of the previous disclosure and has its groove 60 with the plurality of apertures 61 therein connecting with space 62. Lubricant ring or groove 64 circumscribes the port 66 in the piston as well as the closed portion of the piston that closes the passageway or bore 2 in the valve housing 1 in which the piston is mounted.

The lubricant ring 64 adjacent the abutting ends of the rings 58 and 59 is wider than the other portion of the groove, being in the ratio of 2 to 1 for reasons previously set forth. The groove 64 is provided with ducts 63 that connect ring 64 with space 62 such that lubricant may continually reach groove 60. Element 65, similar to element 57, may be inserted in groove 60 across the beveled ends of ring 59, if so desired. From the foregoing it is apparent that each of the lubricant rings cooperate directly with ring 59 and that there are alternate lubricant and metal contacts with the cylinder wall making possible a succession of seals and assuring a more nearly perfect seal against leakage of pressure fluid. The lubricant groove 64 lies immediately adjacent the ring 59 in the same manner as groove 43 lies adjacent ring 4.

The valve housing 1 is provided with an indicator 66 to inform the operator whether the valve is opened or closed. The shaft 67 mounting indicator 66 has an eccentric (shown in Fig. 22) engaging in slots 68 in piston 4 for rotating pointer 66 in the manner described in the above identified application. The construction and operation thereof is identical with that in the application identified above.

Figs. 14–19 disclose another form of piston valve having the leakage control therein and which incorporates a throttle and flow control in the piston thereof.

The valve comprises a housing 70 with the bore or passageway 71 therein connectible to suitable pressure fluid transmitting conduits as is well known in the art. Each housing 70 has associated therewith a cylinder 72 the axis of whose bore is transverse to the axis of passageway 71. Piston 73 is slidably mounted in the cylinder 72 and is reciprocated by pressure fluid derived from the conduits to which the valve is connected and the admission of pressure fluid to the ends of cylinder 72 is controlled by a valve and conduit assembly more particularly illustrated in Figs. 8 and 9. The same parts and conduits of the control circuit appear in Fig. 14 as in Figs. 8 and 9 and the same numerals are employed except that they are primed (') to indicate a different application of the control circuit.

The piston 73 has arranged thereon a pair of pressure rings 74 and 75 on each end thereof which may be similar to those described in connection with pistons 4, 4' and 4" above. The purpose and operation of rings 74 and 75 is identical with that set forth above. The piston also has appropriately shaped lubricant grooves 76 therein which are similar to grooves 43 above.

These grooves 76 cooperate with pressure rings 74 and 75 to prevent leakage of pressure fluid from the high pressure side of the valve to the low pressure side of the valve. They are so disposed and shaped such that leakage is prevented whether the closed or shut-off end of the valve is opposite passageway 71 or whether the open or throttling end of the valve is opposite or in line with the passageway 71.

The cylinder 72 is provided with removable heads 77 and 78 the latter of which mounts the throttling and flow control element 79 in the piston 73.

The piston 73 is equipped with a solid end 80 and on its opposite end has the throttle and flow control element 81 fixed in the bore 82 normally adapted to be aligned with the bore 71 when the valve is in its open position. The throttle and flow control unit 81 comprises a butterfly element of a shape or section more or less along the outline of that shown in Fig. 18 and which in the closed position thereof substantially shuts off the bore 82 when no or a very little pressure fluid flow will occur. In view of the fact that the valve is adapted to handle pressures of considerable magnitude it is evident that a substantial force will be exerted against the butterfly element 81 which may amount to several tons of force and to take up the thrust imposed on the butterfly 81 and still be able to rotate the butterfly it is mounted in bearings 83, 83, shown generally in Fig. 14 but more specifically in Fig. 19.

Each of the bearings 83, comprise an extended sleeve element 84 having a portion threaded into webs 85, 85 which constitutes a closure as well as gland. The lower portion of sleeve 84 is adapted to be received in a heavy bronze bushing 86 which is of generous proportions to enable it to withstand the thrust imposed thereupon. The upper end of the sleeve has a head 87 such that the sleeve 84 may be turned home and be firmly seated on the webs 85. As will be observed from Fig. 14, there are two such sleeves 84 arranged in the piston 73, and the ends of the sleeves 84 are preferably directed towards each other. The piston in the closed end is provided with a transverse strut 102 to reinforce it such that it will be enabled to withstand the force of the pressure fluid thereagainst when the piston is in the closed position.

The butterfly element 81 has a rather enlarged central portion 88, the ends of which are cupped as at 89 and 90 to enable them to receive the bearing bushings 86. The interior of the sleeve 84 and of the portion 88 is bored and interiorly splined as more clearly shown in Fig. 18. Centrally disposed of these elements is a shaft or rod 91 which is externally splined to cooperate with the internal spline of part 88. Keys may be substituted in lieu of the splines if so desired on rod 91.

The rod or shaft 91 extends upwardly through the cylinder head 78 and has a packing gland 92 associated therewith which has provisions for adjustment by means of the plurality of screws 93, the gland 92 preventing leakage of pressure fluid. A bearing bracket 94 is removably secured to the cylinder head 78 and receives the upper end of the shaft 91. A worm gear 95 is fixed to the end of the shaft 91. Mounted to one side of bracket 94 are secondary bracket elements 96, 96 which have a shaft 97 rotatably mounted therein and on which a worm 98 is mounted that engages worm gear 95. A hand wheel 99 is fixed to shaft 97 for the purpose of rotating gear 95, shaft 91 and ultimately butterfly 81.

Fixed to shaft 91 at its upper end and preferably above gear 95 is an indicating arrow 100 whose function is to inform the operator of the position of butterfly 81 in the bore 82 of piston 73. Axial motion of the shaft 91 relative to head 78 is prevented by equipping shaft 91 with a dowel or pin 101 which engages the underside of the cylinder head 78.

Figure 14:
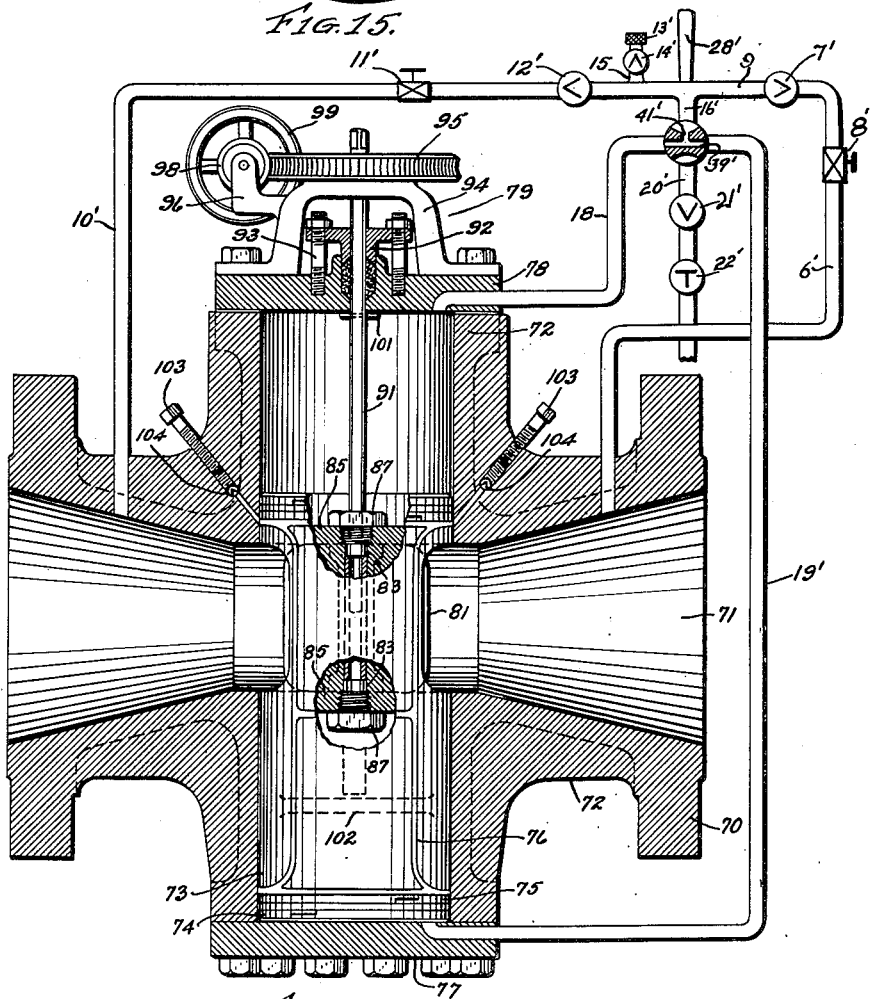
Fig. 14 shows a vertical section view of a modified form of the valve with a schematic control circuit incorporated therein.

The operation of the device of Figs. 9–14 as to the reciprocation of the piston is precisely the same as that set forth for Figs. 8 and 9 above, which also applies to the circuit diagram set forth in Fig. 14. Additionally, however, means for controlling flow of fluid and its pressure is provided for by means of the butterfly 81 and the position of the butterfly 81 is determined by means of worm and wheel 95, 98. By referring to Fig. 14, it will be apparent that the valve piston 73 is in the open position therefore subjecting the pressure fluid in the conduit connected thereto to the control of the butterfly element 81. The splined connection between shaft or rod 91 and the element 81, 88 allows relative movement of piston and rod and still adapts the butterfly valve 81 for rotational control. The piston when in its closed position will have strut 102 immediately proximate to the lower end of rod 91. Pressure sealing lubricant is admitted and formed into channels 76 through ducts provided in housing 72 in which check valves 104, 104 are located by means of screws 103", 103. These devices function exactly as screws 52, 52 above.

The leakage prevention is employed in another modification of the invention wherein a replaceable liner is employed and the grease or lubricant feeding elements are employed to effect a seal between the liner element and the valve casing. This feature is embodied in Figs. 20–22 wherein 105 is a valve housing having a piston 106 slidable in a cylinder 107 which as shown is one similar to 4 above but one similar to 73 may also be employed. The cylinder 107 is provided with removable heads 108 and 109 secured thereto by convenient screws. The axis of the cylinder and the axis of the bore 110 in housing 1 are transversely disposed one to the other. The piston 106 is adapted to be reciprocated in cylinder 107 by pressure fluid means controlled from valve 111 identified as 17 as in Figs. 8 and 9 above. The control circuit identified by double primed numbers for the reciprocation of piston 105 is identical with that described above in connection with Figs. 8 and 9.

The cylinder 107 is provided with a removable liner 112 which more or less loosely fits the bore of cylinder 107. Liners are well known in the internal-combustion motor and munitions arts devices and in other arts as well, where they are force fitted into the casings or housings but in valve devices similar to the above, it is highly desirable that the liner fit more or less loosely such that it can be removed from the valve housing in which it rests thereby obviating the removal of the entire valve when it is necessary to service the piston-cylinder portion of the valve. Clearances between the liner 112 and the cylinder housing 107 are intended to be maintained between 0.001 inch and 0.003 inch but any other dimension may be used as long as the liner can be manually removed by lifting same from the valve housing without the use of preheating or other force generating equipment and the lubricant seal will still be sustained under applied pressure from the pressure fluid.

Since the liner 112 fits more or less loosely within the cylinder housing, means is provided to prevent movement of the liner relative to the cylinder housing. This is accomplished by having a close fit between the bushing 113 of the indicator 115 and the liner 112. The bushing 113 will prevent not only relative axial motion of the liner but rotation as well. The bushing 113 rotatably receives a shaft 114 to which a pointer or indicator 115 is attached to inform the operator of the open or closed position of the valve. Shaft 114 has a roller 116 held thereon with an eccentric 117 that engages a double slot 118, 119 in the piston wall. The complete operation of the device is fully set forth in the above identified application.

The gasket material ordinarily placed between cylinder head and cylinder is not effective to prevent leakage of pressure fluid between liner 112 and housing 107. To this end the lubricant system is employed originating in screws 120, 120, threaded into bore 121 and having a check valve 122 therein. Lubricant normally flows from the port 123 to grease grooves in the piston surface and after these are filled grease then occupies space between the liner 112 and housing 107. There are two lubricant screws provided and grease will proceed from the port 123 between the liner and housing to fill the space between liner and housing. Should more than two ducts 123 be required to fill the space, they may be added. Lubricant is supplied to the aforesaid space until such time as the surface tension between lubricant and liner and housing exceeds the pressure tending to break it down.

By the use of the liner, should there be a failure in the motor end of the valve or a scoring of the same the liner and piston may be replaced in situ thereby obviating the replacement of the entire valve as is now the current practice.

Figure 20:
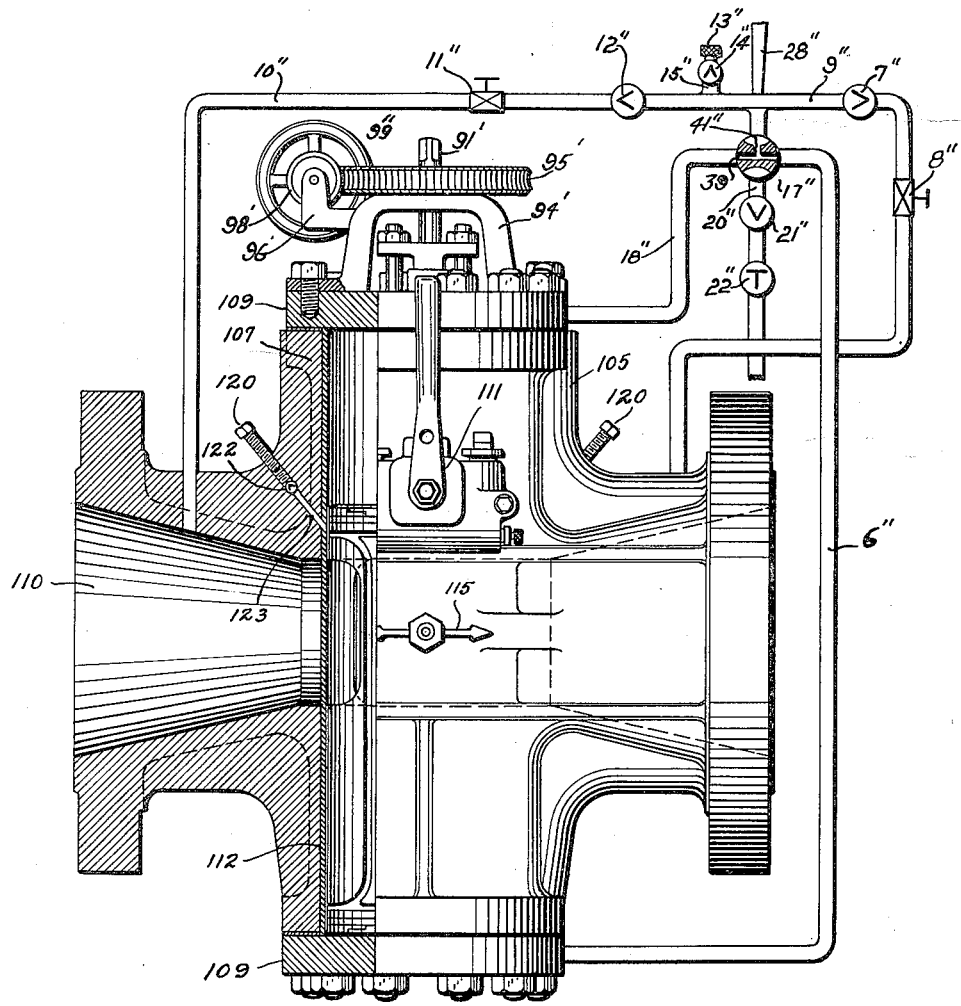
Fig. 20 shows a side view partly in section of another modification of the valve organization of Fig. 1 including the schematic control circuit.
Figure 21:
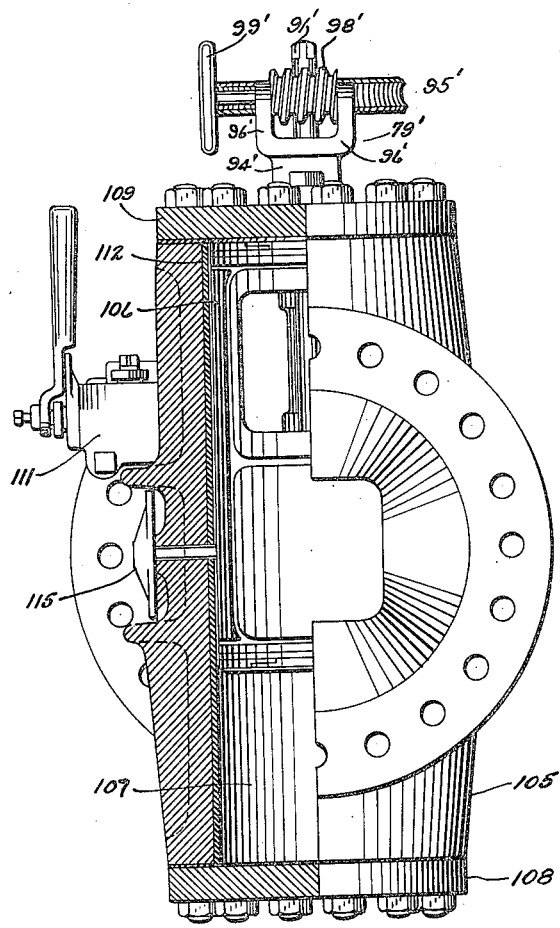
Fig. 21 shows an end view partly in section of the valve of Fig. 20 including the control circuit housing.

The piston shown in Figs. 20 and 21 is of the type shown in connection with Figs. 14–19, viz.; the throttle type although a piston of the types set forth in Figs. 1–13 is employable. Mechanism for actuating the throttle element in Figs. 20, 21 is identical with that shown in Figs. 14–19 and the same parts bear primed numbers to denote a different application.

Part 111 in Figs. 20, 21 has contained therein the control valves and cooperating parts as indicated by double primed numbers, and in Figs. 14–19 the primed valve numbers are likewise contained in a similar housing but not shown as it is identical with part 17 and 111. The detailed explanation of part 17 applies to the disclosures of Figs. 14–22.

That which is regarded new, novel and useful and which is sought to be protected by Letters Patent of the United States is as follows.

I claim:

1. In a pressure fluid control; a housing having a passageway adapted to transmit pressure fluid; a cylinder formed in said housing whose axis is transverse to the axis of said passageway; a piston reciprocably mounted in said cylinder; means to control the reciprocation of said piston from pressure fluid derived from said passageway; conduits leading from said passageway on either side of said cylinder, said conduits connected to a duct in said housing and by means of a transverse duct is connected to said control means; a check valve slidable in said duct to selectively check one of said conduits and to positively open the other of the conduits; and conduit means in said control to equalize the pressure between said passageway and the two ends of said cylinder to prevent leakage between the inlet side of said housing passageway and the two end chambers of said cylinder.

2. In a pressure fluid control; a valve housing having a bore therein for the transmission of pressure fluid; a cylinder associated with said housing whose longitudinal axis is transverse to the axis of said bore; a piston in said cylinder adapted to open or close said bore; a control means to selectively admit pressure fluid to said cylinder; conduits connected to opposite ends of said bore to conduct pressure fluid from said bore said conduits connected to a duct in said housing and by means of a transverse duct is connected to said control and to opposite ends of said cylinder; a unitary element having check valves on each end thereof arranged in said housing duct, said valves adapted to control the opening or closing of said conduits on one or the other side of said control and duct means in said control to equalize the pressure at bore pressure on each end of said cylinder when said control is in its neutral position.

3. In a pressure fluid valve; a housing having a pressure fluid conducting bore and a cylinder; a piston in said cylinder adapted to open and close said bore; means to reciprocate said piston in said cylinder with pressure fluid derived from said bore; control means to selectively apply said pressure fluid to opposite ends of said cylinder; and means to prevent pressure fluid leakage between said piston and said cylinder which includes duct means in said control to equalize the pressure between said bore and said cylinder over a portion of said leakage area and combination grease and pressure rings to seal said piston in said cylinder.

4. In a pressure fluid control; a valve housing having a bore and cylinder whose longitudinal axis is transverse to said bore; a piston reciprocably mounted in said cylinder, and adapted to close or open said valve; a control element mounted on said housing; conduits connected to said control element and to said bore on opposite sides of said cylinder; a double check valve in said element adapted to check one or the other of said conduits; a reversing valve in said element and conduits connected between said element and said cylinder such that said reversing valve may selectively admit pressure fluid to the ends of said cylinder; and an indicator mounted on said housing immediately below said control element to indicate the position of said piston in said cylinder.

5. In a valve; a housing having a passageway therein for pressure fluid and a cylinder whose bore is transverse to said passageway; a piston in said bore adapted to open or close said passageway; a control valve on said housing; conduits connecting said valve and opposite ends of said passageway the end portions of said conduits coaxially joined; conduits connecting said valve and the ends of said cylinder; a member having two valves thereon movable in the coaxially joined portions of said conduits; a porting in said valve adapted to equalize the pressure in said cylinder and said passageway about a portion of the piston area contacting said cylinder to prevent leakage of pressure fluid; pressure rings adapted to confine pressure fluid to said cylinder and a lubricant seal cooperating with said pressure rings to enable them to more effectively hold said pressure fluid.

6. In a valve piston construction adapted to open and close the passageway of a piston valve including; a cylindrical body element having a passageway formed in one end thereof; said body having a plurality of grooves adapted to receive pressure sealing lubricant, and whose plan is such that they circumscribe the passageway in said body, some of said grooves being circumferentially disposed of said body; a plurality of pressure rings on the ends of said piston; one of said rings externally grooved to receive pressure sealing lubricant; and duct means connecting said circumferential groove and said ring groove such that lubricant may flow from said circumferential groove to said ring groove.

7. In a valve piston organization; a piston comprising a cylindrical body member having a bore near one end thereof; said body having a plurality of grooves formed in each end of said body; pressure rings in said grooves; said body having pressure sealing lubricant grooves on the surface thereof some of which are circumferentially disposed of said body; one of said circumferential grooves at each end of said piston being a continuation of one of said ring grooves at each end of said piston; said grooves having a pressure sealing lubricant therein, said lubricant in said circumferential grooves lying immediately adjacent said pressure ring to reinforce its pressure sealing action.

8. In a valve organization; a housing having a bore and a cylinder; a piston reciprocably mounted in said cylinder and having a passageway therethrough adapted to coincide with the said bore when said valve is open; a pair of rings on each end of said piston; said piston having pressure sealing lubricant in grooves formed thereon, some of said grooves being so disposed such that said lubricant supplements one of said rings of each pair; means to control the reciprocation of said piston in said cylinder including duct means connectible to each end of said cylinder to equalize the pressure in said cylinder and in said bore to prevent leakage between said piston and said cylinder when said valve is open; a butterfly valve associated with said bore in said piston; means to adjust said butterfly valve in said piston bore; and said ducts for equalizing the pressures in said cylinder and in said bore preventing leakage when said butterfly is in a substantially closed position.

9. In a valve piston organization; a cylindrical body member having a bore through one end thereof; a butterfly element rotatably disposed in said bore; a plurality of pressure rings on each end of said body; said body having grooves formed in the surface of said body and circumscribing said bore and similarly circumscribing the closed end of said body; pressure sealing lubricant in said grooves; and said lubricant and said pressure sealing rings cooperating to prevent leakage about both ends of said body.

10. In a pressure-fluid shut-off and throttling valve; a housing having a passageway and a cylinder formed therein, the axes of each being transversely disposed; a piston reciprocably mounted in said cylinder; said piston having a transverse bore that in the open position of the valve is adapted to coincide with said passageway; means including a control valve to reciprocate said piston; a butterfly element rotatably mounted in said piston bore; and means to prevent leakage from one side of said valve to the other which includes a conduit circuit including a duct in said control valve to equalize the pressure in said passageway and in said cylinder to prevent leakage between one side of said valve and said piston and pressure rings on each end of said piston; and said piston having lubricant grooves formed therein for holding a pressure sealing lubricant that acts jointly with said rings to prevent leakage between said piston and the other side of said valve; said ring and lubricant active whether pressure is exerted against said piston or against said butterfly.

11. In a pressure fluid valve; a housing having a passageway for the transmission of pressure fluid, and a piston-cylinder device the axis of which is transverse to the axis of said passageway; means to reciprocate said piston by pressure fluid derived from said passageway; a control valve for said means; and means to prevent leakage from one side of said valve to the other which includes duct means in said control valve to equalize the pressure between said cylinder and said passageway to prevent leakage between one side of said valve and the cylinder; pressure sealing rings on said piston; and said piston having lubricant grooves formed therein some of which are immediately adjacent some of said rings and having pressure sealing lubricant therein acting jointly with said rings to prevent leakage between said cylinder and the other side of said valve.

12. In pressure fluid conducting control valve; a housing having a passageway therethrough and a transversely disposed piston-cylinder device, one side of said housing being the high pressure side and the other the low pressure side; said piston having a bore in one end thereof adapted to coincide with said passageway when said valve is open; means to reciprocate said piston from pressure fluid derived from said passageway; a butterfly valve rotatably mounted in said bore formed in one end of said piston; valve means to control the reciprocation of said piston; means to control the angular position of the butterfly; and means to prevent leakage from the high pressure side of said valve to the low pressure side which includes duct means in said valve to equalize the pressure in said cylinder and in said passageway to prevent leakage between the high pressure side of said valve and said cylinder; pressure rings on said piston; said piston having lubricant grooves thereon some of which lie immediately adjacent some of said rings and having pressure sealing lubricant therein acting jointly with said rings to prevent leakage between said cylinder and said low pressure side of said valve.

13. In a pressure fluid conducting control valve; a housing having a pressure fluid passageway; a piston-cylinder transversely disposed to said passageway; said piston having a bore in one end thereof adapted to coincide with said passageway when said valve is open; a butterfly element rotatably mounted in said bore in said piston; means to rotate said butterfly element; means to reciprocate said piston from pressure fluid in said passageway; means to control said means; means to prevent leakage of pressure fluid past said piston which includes a duct in said control to equalize the pressure in said cylinder and in said passageway to prevent leakage between said piston and one side of said cylinder, and pressure rings and pressure sealing lubricant held in grooves surrounding said passageway and directly cooperating with said rings to prevent leakage between said cylinder and the other side of said valve.

14. In a pressure fluid valve; a housing having a passageway therethrough; a piston-cylinder device formed as a part of said housing the axis of whose bore is transverse to said passageway; means to reciprocate said piston from pressure fluid in said passageway; means to control said means; a removable liner in said cylinder in which said piston is adapted to reciprocate; an indicator rotatably mounted in a wall of said housing and operatively associated with said piston; said indicator preventing relative movement of liner and cylinder; means to prevent leakage between the two sides of said valve and said cylinder which includes a duct means in said control to equalize the pressure between said passageway and said cylinder to prevent leakage between one side of said valve and said piston; pressure ring and lubricant sealing means to prevent leakage between said cylinder and the other side of said valve, and lubricant means to prevent leakage between said liner and housing and said other side of said valve, said lubricant being supplied from a common source.

15. In a pressure fluid valve; a housing having a pressure fluid conducting passageway therethrough; a piston-cylinder device associated with said housing; means to reciprocate said piston from pressure fluid derived from said passageway; means to control said means; a removable liner in said cylinder; an indicator mechanism rotatably mounted in said housing to indicate piston position; said mechanism preventing relative motion of said liner and cylinder; and lubricant means to prevent leakage between said liner and cylinder and between piston and cylinder.

16. In a piston device; a longitudinally extended cylindrical body forming a piston and having a bore in one end thereof; a butterfly valve element rotatably mounted in the bore one end thereof; a plurality of pressure rings arranged on each end thereof the jointed ends of said rings disposed in substantially the same quadrant of said piston; said piston having pressure sealing lubricant grooves formed thereon some of which are circumferentially disposed relative to said piston and adjacent one of each group of said rings and some of said circumferentially disposed grooves being wider in one portion thereof; said wide portion of said grooves lying opposite the jointed ends of said pressure rings.

17. In a throttle and shut-off valve; a housing having a pressure fluid conducting passageway therein and a piston-cylinder device transversely disposed thereto; said piston having a bore formed in one end thereof; a throttle valve adjustably mounted in said piston bore; said piston when in one position adapted to shut-off said passageway and when in another position is adapted to transmit pressure fluid past said throttle through said bore and passageway; pressure sealing rings on both ends of said piston; lubricant retainers on said piston having a configuration such that they will surround said passageway, some of said retainers circumscribing said passageway when said piston is in either the open or closed position; lubricant in said retainers to reinforce the sealing ability of said pressure rings; means to adjust said throttle valve; means on said means to indicate the position of said throttle and control means to govern the reciprocation of said piston in said cylinder.

18. In a piston for a piston valve; a longitudinally extended cylindrical element having a bore in one end thereof; a butterfly element rotatably mounted in said bore; bearing means in which said butterfly is supported; and a splined rod extending into said cylindrical element along which said butterfly is adapted to slide and which is also adapted to rotate said butterfly element.

19. In a control valve; a housing having a passageway therethrough connectible to pressure fluid transmitting lines; a piston-cylinder device transversely disposed to said passageway; a removable liner in said cylinder in which said piston slides; a pair of pressure rings on each end of said piston; lubricant retainers formed on the surface of said piston and having a configuration on each end thereof of the same general shape as said passageway on both sides of said piston, some of said retainers circumscribing said piston adjacent one ring of each of said pair of rings; means to introduce lubricant into said retainers; means to hold said liner in said cylinder and adapted to indicate the position of said piston in said cylinder; and said means to introduce lubricant further adapted to prevent leakage between said liner and said cylinder.

20. In a shut-off and control valve; a housing having a passageway therethrough; a cylinder formed in said housing whose axis is transverse to the axis of said passageway; a piston in said cylinder; a control valve; conduits connecting said passageway and said control valve; conduits connecting said control valve and said cylinder; said piston having a closed end adapted to shut-off said passageway and a bored end and having a throttle in its bore adapted to control pressure fluid flow when said bore is opposite said passageway; means on said piston to prevent leakage of pressure fluid through said cylinder, which includes pressure rings on each end of said piston and lubricant disposed in channels adapted to circumscribe said passageway on each end of said piston, some of said channels circumferentially disposed about said piston adjacent one of said rings on each end of the piston; a splined shaft fixed in one end of said cylinder and splined to said throttle and means on said cylinder operatively associated with said shaft to rotate said throttle in said piston bore.

21. In a control for a high pressure valve; a housing having a bore and a cylinder whose axes are transverse to each other; a piston reciprocably mounted in said cylinder adapted to open or close said bore; means to govern the reciprocation of said piston, said piston reciprocated by pressure fluid passing through said valve selectively derived from both sides of the valve which includes a reversing valve, and a double check valve to check flow of pressure fluid from one side of said valve to said means; and an indicator on said valve disposed immediately below said means to indicate the position of said piston in said cylinder.

22. In a pilot for a piston valve; a housing for said valve; a reversing valve rotatably mounted in said housing; a pair of conduits leading to a duct in said housing and terminating in a single transverse duct leading to said reversing valve; a check valve associated with each of said conduits; one of said valves disposed on each side of said transverse duct in said duct; means rigidly connecting said valves; said means inhibiting the fluttering of said individual check valves and preventing the transmission of pulsation to said reversing valve; equalizing ducts in said reversing valve; an exhaust valve in said housing; and means on said reversing valve to actuate said exhaust valve.

23. In a piston valve; a housing having a pressure fluid conducting passageway and a cylinder whose axis is transverse to that of said passageway; a piston in said cylinder, said piston reciprocable by pressure fluid derived from said passageway; and means to govern the reciprocation of said piston which includes a pilot valve fixed to said housing, conduits connecting said passageway with a duct in said means, a transverse duct in said means connecting said duct and said pilot valve, conduits connecting said pilot valve and the ends of said cylinder, a stop valve in each of said inlet conduits; a check valve associated with each of said inlet conduits; said check valves arranged one on each side of said transverse duct and means rigidly connecting said check valves to prevent the transmission of pulsation in the pressure fluid in said passageway from being transmitted past said pilot valve and into said cylinder.

24. In a piston valve; a valve housing having a pressure fluid conducting passageway and a cylinder whose axis is transverse to that of said passageway; a piston in said cylinder adapted for reciprocation therein and having a bore in one end adapted to coincide with said passageway when the valve is open; and means to reciprocate said piston with pressure fluid derived from said passageway including a reversing valve to selectively direct pressure fluid to a desired end of said cylinder, a housing for said reversing valve, a pair of conduits connected between said passageway and said reversing valve, said conduits terminating in a duct in said housing connecting with a transverse duct leading to said reversing valve; a manually operated stop valve in each conduit, pressure fluid actuated check valves in said duct, one disposed on each side of said transverse duct, and means rigidly connecting each check valve to positively open or close a selected one of said check valves and to prevent the transmission of pressure pulsation in said passageway to said cylinder.

25. In a piloting element for a piston valve; a housing for said pilot valve; a reversing valve rotatably mounted in said housing; said housing having a first duct therein to which inlet conduits are connectible; said housing having other ducts to which exhaust conduits are connectible; a single duct connectible with said first duct leading to said reversing valve; a pair of check valves arranged on a single support; said first duct having a pair of valve seats therein; said check valves selectively engageable with either of said valve seats to thereby control the flow of pressure fluid from said first duct and associated conduits to said single duct; and said single support preventing the transmission of pulsations in said first duct past said reversing valve and into said exhaust conduits.

26. In a piston for a piston valve; a longitudinally extended cylindrical body forming a piston having a passageway therethrough at one end thereof; a pair of pressure rings disposed in grooves on each end of said piston; said piston having lubricant grooves disposed about both ends of said passageway connecting with lubricant grooves lying adjacent said ring grooves; said piston having ducts formed in the body thereof connecting said lubricant grooves at each end of said piston with the adjacent ring grooves; the ring in said ring groove adjacent said lubricant grooves having an external lubricant groove formed therein; a plurality of ducts in said pressure rings adjacent said lubricant grooves to transmit lubricant from the groove in which said grooved rings are disposed to the groove in said grooved pressure rings.

HOMER J. SHAFER.